United States Patent
Groth

[11] 3,781,077
[45] Dec. 25, 1973

[54] HEAT-REFLECTING WINDOW PANE

[76] Inventor: Rolf Groth, Mullensiefenring 8, 5810 Witten, Germany

[22] Filed: June 8, 1971

[21] Appl. No.: 151,035

[30] Foreign Application Priority Data
June 13, 1970 Germany............... P 20 29 181.0

[52] U.S. Cl. .................................. 350/1, 117/33.3
[51] Int. Cl. ............................................ G02b 5/26
[58] Field of Search ................. 350/1, 163–166; 117/33.3

[56] References Cited
UNITED STATES PATENTS

| | | | |
|---|---|---|---|
| 3,531,313 | 9/1970 | Dates | 350/1 UX |
| 2,366,687 | 1/1945 | Osterberg | 350/164 |
| 3,069,301 | 12/1962 | Buckley et al. | 350/1 X |
| 3,118,781 | 1/1964 | Downing | 350/1 X |

FOREIGN PATENTS OR APPLICATIONS
941,976 11/1963 Great Britain ........................ 350/1

Primary Examiner—Ronald J. Stern
Attorney—Hill, Sherman, Meroni, Gross & Simpson

[57] ABSTRACT

A heat-reflecting window pane which has a transmissivity of 20 to 60 percent for visible light comprises a transparent support layer provided with a heat-reflecting gold film and when installed presents the support layer to the exterior. An absorption layer is disposed between the transparent support layer and the gold film, such absorption layer being of a material and thickness such that the light transmissivity of the combined support and absorption layers is 10 to 65 percent less than that of the support layer alone. The support layer has a refractive index and absorption coefficient of the same order of magnitude and may comprise an element from the fourth period of the periodic table with an atomic weight between 20 and 28 or an alloy containing such an element. An anti-reflective layer is disposed on the other side of the gold film and may be covered by a transparent protective layer. The anti-reflective layer, e.g., made of zinc sulphide, is made of dielectric material which is substantially absorption-free for visible light and has a refractive index of more than 1.7.

12 Claims, 5 Drawing Figures

HEAT-REFLECTING WINDOW PANE

BACKGROUND OF THE INVENTION

The subject matter of the present invention relates generally to window panes, and in particular to a heat-reflecting window pane having a transmissivity of 20–60 percent for visible light.

Window panes comprising a transparent support layer provided with a heat-reflecting gold film are known for the glazing of buildings, rail vehicles and omnibuses and prevent excessive heating of the interior space due to incident sun radiation.

Window panes of the kind mentioned heretofore having a gold film with a transmissivity of approximately 30 to 40 of the visible light have been found reliable. However, the golden yellow colour of the panes as seen from the outside and the intensive mirror effect from the inside are found to be disturbing. To avoid these disadvantages it is already known for the gold film to be sandwiched between de-reflecting layers of dielectric material with a high refractive index. In this way, the light transmissivity can be substantially increased, approximately to 70 percent. Seen from the exterior, such window panes have a pleasantly uniform grey-blue colour and exhibit no disturbing reflection as seen from the interior of the room.

For many applications, in particular for the glazing of large offices in which work is done under artificial light, it is desirable to reduce the incidence of visible light to approximately 20 to 60 percent and at the same time to inhibit solar heat irradiation. This may be achieved by increasing the thickness of the gold film but this is then accompanied by the substantial disadvantage that the panes provide an irregular colour impression as seen from the outside and a cloudy effect when looked through.

These irregularities are evidently due to slight fluctuations in the thickness of the layers, in particular of the two de-reflecting layers. With a layer sequence of the kind described hereinbefore, the requirements relating to the uniformity of the layers are so high that they cannot be satisfactorily attained in the coating of the large surfaces which are required in practical applications. Consequently, the rejection rate in the manufacture of such panes would be large and the manufacture uneconomical.

The present invention, therefore, is concerned with the problem of providing a heat reflecting window pane, which is capable of transmitting approximately 20 to 60 percent of the visible light but which, in the same way as for panes having a light transmissivity of 70 percent has a pleasantly neutral grey-blue colour as seen from the outside and permits uniform reflection-free viewing through the pane.

SUMMARY OF THE INVENTION

According to the invention, this is achieved by providing a pane in which the transparent support layer is disposed to the exterior of the building or vehicle when the pane is installed, and in which an absorption layer consisting of a metal, metalloid or metal alloy is disposed between the gold film and the transparent support layer, such absorption layer having a thickness to provide a light transmissivity of the laminate comprising the transparent stratum support and the aforementioned stratum which is 10 to 65 percent less than that of the transparent support layer, the refractive index and the absorption coefficient of the absorption layer corresponding in order of magnitude for visible light, while an anti-reflection layer of highly refractive dielectric material which is substantially absorption-free for visible light and has a refractive index of >1.7 is disposed on the other side of the gold film.

Refractive index and absorption coefficient in this context refer to the quantities $n$ and $k$ of the complex refractive index defined by the known equation $n' = n - ik$.

The disturbing cloudiness of the known pane when provided with a light transmissivity of 20 to 60 percent can be surprisingly and reliably avoided in this way, both with respect to the view from the exterior as well as when looking through the pane, while at the same time the desirable neutral grey-blue colour tone is obtained when the pane is viewed from the exterior and all glare is avoided when looking through the pane from the interior. This advantageous effect can be obtained only with an absorption film which is sufficiently thick that the light transmissivity of the laminate comprising the transparent stratum support and the stratum is at least 10 percent less than that of the transparent stratum support by itself. A film thickness of the order of magnitude of a monomolecular film, as already disclosed as an adhesion base for the gold film, would be completely insufficient in order to provide the desired optical properties.

According to a preferred embodiment of the invention, the absorption film preferably comprises elements of the fourth period of the periodic system having the atomic numbers 20 to 28 or it comprises alloys between such elements or with other elements, for example a chromium nickel or a chromium-iron-aluminum alloy. The refractive index and the absorption coefficient in the range of visible light correspond in terms of the order of magnitude for the aforementioned elements of the fourth period of the periodic system. In the visible light range, these materials do not have a high reflection and they do not substantially alter their spectral transmissivity with a change of wavelength. Particularly advantageous results are obtained if the ratio of refractive index and absorption coefficient varies between 5 : 1 and 1 : 5.

Alloys with highly reflective metals such as gold or silver may be used provided the refractive index and the absorption coefficient of the alloy conforms to the limits stated above. The layers may be deposited by cathode atomisation or vacuum evaporation on the transparent support layer. It has been found advantageous to deposit an absorption film comprising a chrominum-nickel alloy with a composition containing 20 percent by weight of chromium and 80 percent by weight of nickel by means of the vacuum coating method.

The anti-reflection layer consists preferably of ZnS but where appropriate also of $TiO_2$, $CeO2$, $Bi_2O_3$ and $PbCl_2$.

According to a further preferred feature of the invention, the anit-reflection layer is covered by a transparent protective layer, for example of varnish, a quartz layer or the like or, in the manner of a safety glass sheet, is joined by an intermediate layer to a glass cover sheet.

The present heat-reflecting glass pane may also be employed as the outer pane of a double-glazed window. In this case, the layers applied to the transparent support layer are protected against damage since they are disposed within the double-glazed window in the space between the two panes.

BRIEF DESCRIPTION OF THE DRAWINGS

Other objects and advantages of the present invention will be apparent from the following detailed description of certain preferred embodiments thereof and from the attached drawing of which.

DESCRIPTION OF PREFERRED EMBODIMENTS

Figure 1:
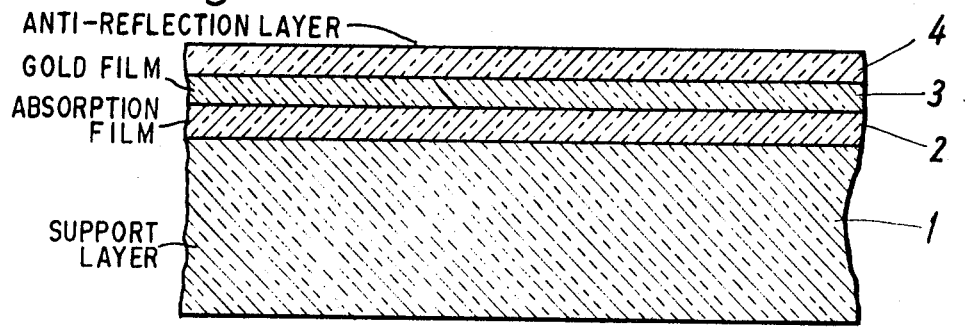
FIG. 1 is a diagrammatic cross-sectional view of a heat-reflecting window pane according to the invention.

Referring to FIG. 1, an absorption film 2, in turn covered by a gold film 3, is disposed on a transparent support layer 1 made, for example, of silicate glass. An anti-reflection layer 4 is disposed on the gold film. The absorption film 2 comprises a chromium-nickel alloy containing 20 percent by weight of chromium and 80 percent by weight of nickel and is sufficiently thick to ensure that the light transmissivity of the partial laminate comprising the transparent support layer 1 and the absorption film 2 is 17 percent less than the light transmissivity of the transparent support layer by itself. The thickness of the gold film depends on the desired light transmissivity of the heat-reflecting pane and is usually of the order of magnitude of 150 – 400 A. The anti-reflection film 4 consists of ZnS and has a thickness of approximately 400 A so that it functions as an $\lambda$4 plate for a wavelength ($\lambda$) of approximately 550 m$\mu$ and thus has a particularly good anti-reflection effect in the visible light range to which the human eye is most sensitive. When the pane is inserted into the window frame, the glass sheet 1 will be disposed on the outside of the window.

Figure 2:
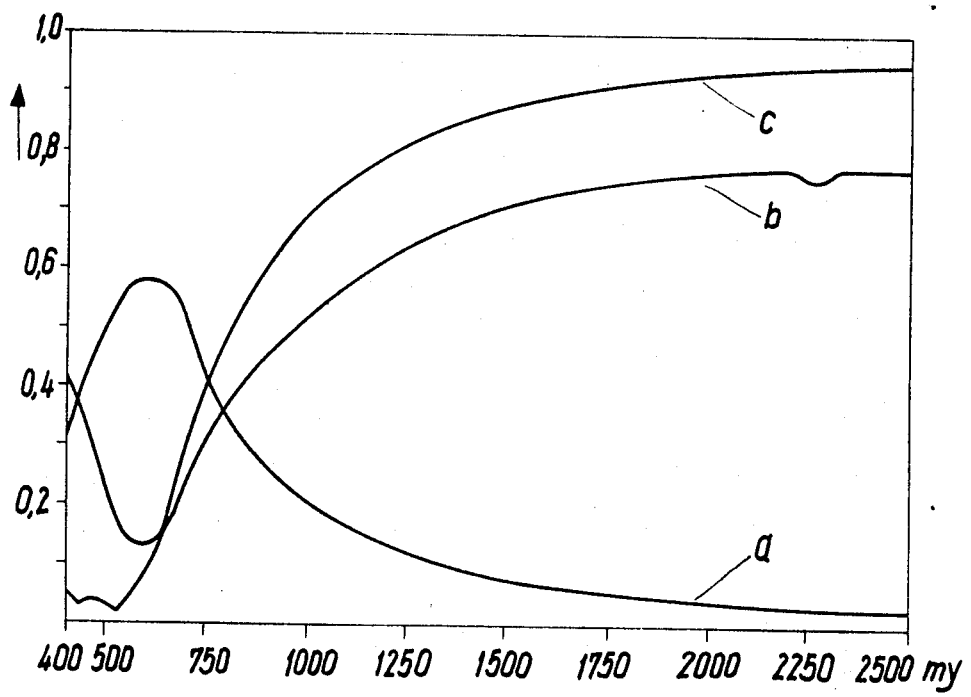
FIG. 2 shows the spectral transmissivity and reflection curve of a heat reflecting window pane according to the invention for the wavelength range between 400 m$\mu$ and 2,500 m$\mu$.

Curve (a) illustrated in FIG. 2 represents the spectral transmissivity of a heat-reflecting window pane according to the invention for the wavelength range of 400 m$\mu$. The transmissivity is a maximum in the wavelength range to which the human eye is most sensitive, that is to say in the range of approximately 550 m$\mu$. The transmissivity diminishes extensively towards longer wavelengths so that the infrared part of the sun radiation passes only to a very slight extent through the pane.

Curve (b), representing the spectral reflection of the heat-reflecting pane from the glass side, indicates that the long-wave, infrared part of the solar radiation is largely reflected. In the visible range, the reflection from the externally disposed glass side amounts to approximately 14 percent. This reflective property is advantageous in architectural terms since, on the one hand, it ensures that the window panes do not provide excessive glare for an observer of the building but, on the other hand, it avoids a dead, mat appearance of the windows.

Curve (c), shown in FIG. 2 relates to the spectral characteristics of reflection from the internally disposed side of the window. It will be noted that only approximately 3 to 4 percent of the incident radiation is reflected in the wavelength range of approximately 550 m$\mu$ in which the eye has its maximum brightness sensitivity. By contrast, an uncoated clear glass pane will reflect approximately eight percent of the visible light. The heat reflecting window pane according to the invention therefore has a substantially smaller glare effect from the interior than that of an ordinary clear glass pane.

Figure 3:
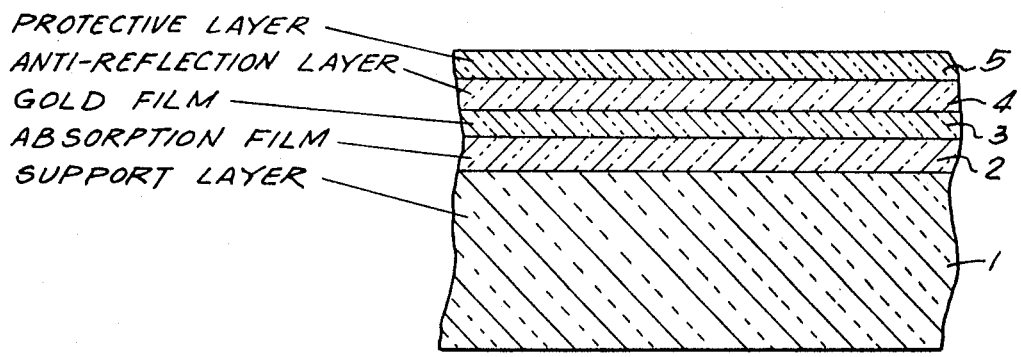
FIG. 3 is a diagrammatic cross-sectional view of another embodiment of the invention.
Figure 4:
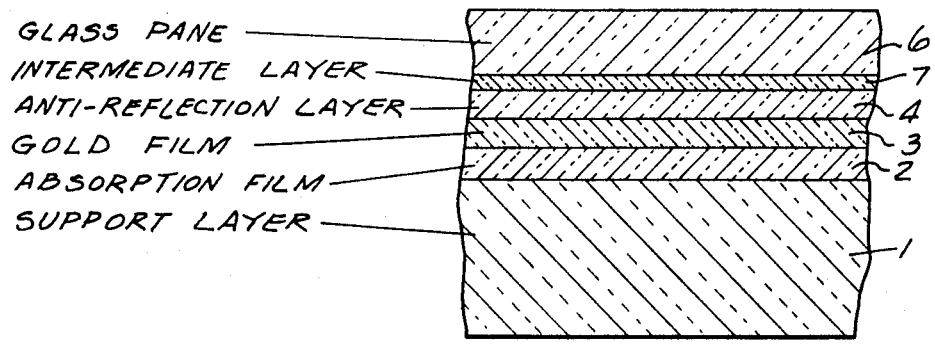
FIG. 4 is a diagrammatic cross-sectional view of yet another embodiment of the invention.

In the embodiment of the invention shown in FIG. 3 a protective layer 5 of scratch-proof material covers the free side of the anti-reflection layer 4, while in the embodiment of FIG. 4 said protective layer 5 of FIG. 3 has been replaced by a glass pane 6 joined to said anti-reflection layer 4 by means of an intermediary layer 7.

Figure 5:
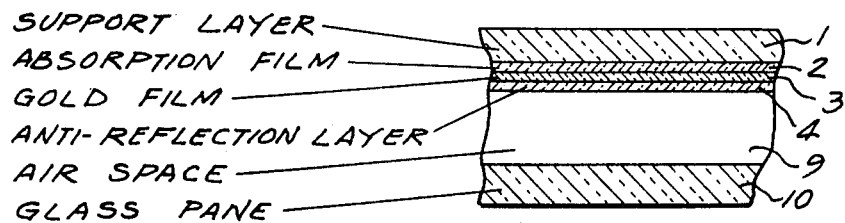
FIG. 5 is a diagrammatic cross-sectional view of a part of a double-glass window pane with the heat reflecting pane of the invention built into the same.

According to FIG. 5 the heat-reflecting pane 1, 2, 3, 4 of the invention is built into a double-glazed window in such a way that an air space 9 is enclosed between the anti-reflection layer 4 of said heat-reflecting pane and a single glass pane 10.

Example 1

A silicate glass sheet of 5 mm thickness and a size of 2 m × 3 m is disposed in a large vapour coating plant with vapour coating apparatus for applying three layers. After the vapour coating vessel is loaded with a chromium nickel alloy consisting of 80 percent by weight of nickel and 20 percent by weight of chromium, the plant is evacuated to a pressure of approximately 3 × 10$^{-2}$. The glass surface is subsequently cleaned for eight minutes by glow discharge and is freed from any adhering water film. The layers 2, 3 and 4 are vapour coated on to the glass sheet after further evacuation to a pressure of 6 × 10$^{-5}$. To improve the uniformity of the vapour coated layers, the glass sheet is rotated about its central axis during the vapour coating operation.

Vapour deposition of the chromium-nickel alloy reduces the light transmissivity of the glass sheet from 90 percent at the beginning of the vapour coating operation to 70 percent. The ZnS film, vapour coated after the gold film is vapour coated, has a thickness of approximately 400 A.

The heat reflecting window pane produced in this manner has the following optical properties:

Light transmissivity (referred to the sensitivity of human eye)— 57 percent
Reflection from the film side (referred to the total solar radiation)— 39 percent
Reflection from the glass side (referred to the total solar radiation)— 38 percent
Transmissivity (referred to the total solar radiation)— 35 percent In use, the window pane is installed in a window frame so that the glass sheet is disposed on the outside when installed. When observed from the exterior of the building, the window pane presents the desired uniform grey-blue colour tone and does not show any irregularities, even when looked through from the interior.

By contrast, a window pane provided with vacuum coating applied for comparision purposes under the same conditions but having a further ZnS film in place of the absorption film and in which the light transmissivity is reduced to 55 percent by a corresponding increase in the thickness of the gold film is irregular when looked through from the interior after installation and is patchy.

Example 2

The absorption film comprising a chromium-nickel alloy of the same composition as in example 1 is vacuum deposited on the glass sheet in such thickness that the light transmissivity is reduced to 62 percent. Subsequently, gold and then ZnS is vacuum deposited as a λ/4 layer in the manner already described above.

The heat-reflecting window pane obtained in this manner has the following optical properties:

Light transmissivity (referred to the sensitivity of the human eye)— 45 percent
Reflection from the film side (referred to the total solar radiation)— 41 percent
Reflection from the glass side (referred to the total solar radiation)— 39 percent
Transimissivity (referred to the total solar radiation)— 26 percent Example 3

An alloy, comprising of 25 percent by weight of chromium, 70 percent by weight of iron and 5 percent by weight of aluminum is used to form the absorption film. The thickness of the vacuum deposited absorption film is such that the transmissivity of the glass pane is reduced to 72 percent. A gold film and then an anti-reflection film of ZnS are subsequently vacuum deposited on the absorption film.

The following optical properties of this heat-reflecting window pane were measured:

Light transmissivity (referred to the sensitivity of the human eye)— 55 percent
Reflection from the film side (referred to the total solar radiation)— 39 percent
Reflection from the glass side (referred to the total solar radiation)— 38 percent
Transimissivity (referred to the total solar radiation)— 34 percent The glass panes produced in accordance with examples 2 and 3 and after installation in a window frame so that the glass sheet is on the exterior, also have a pleasant, uniform grey-blue colour tone when viewed from the outside and do not exhibit any cloudiness or irregularities when viewed from the interior.

It will be obvious to those having ordinary skill in the art that changes may be made in the above-described details of preferred embodiments of the invention without departing from the spirit and scope of the invention as hereinafter defined in the appended claims.

I claim:

1. A heat-reflecting window pane which has a transmissivity of 20 to 60 percent for visible light and which comprises a transparent support layer provided with a heat-reflecting gold film, wherein the improvement resides in that:

an absorption layer comprising a material selected from the group consisting of metals, metalloids and metal alloys is disposed between the gold film and the transparent support layer, the absorption layer having a thickness to provide a light transmissivity of the laminate comprising the transparent support layer and the absorption layer which is 10 to 65 percent less than the transmissivity of the transparent support layer, and the absorption layer having a refractive index and an absorption coefficient which correspond in order of magnitude for visible light;

an anti-reflection layer of highly refractive dielectric material which is substantially absorption-free for visible light and has a refractive index of more than 1.7 is disposed on the other side of the gold film; and the pane when installed presents the transparent support layer to the exterior.

2. A heat-reflecting pane in accordance with claim 1, wherein the light transmissivity of the laminate comprising the transparent support layer and the absorption layer is 15 to 60 percent less than that of the transparent support layer.

3. A heat-reflecting pane in accordance with claim 1, wherein the absorption layer has a refractive index and an absorption coefficient which are approximately identical for visible light.

4. A heat-reflecting pane in accordance with claim 1, wherein the absorption layer comprises an element from the fourth period of the periodic table and having an atomic number between 20 and 28.

5. A heat-reflecting pane in accordance with claim 1, wherein the absorption layer comprises an alloy including an element from the fourth period of the periodic table and having an atomic number between 20 and 28.

6. A heat-reflecting pane in accordance with claim 5, wherein the absorption layer comprises a chromium nickel alloy.

7. A heat-reflecting pane in accordance with claim 5, wherein the absorption layer comprises a chromium-iron-aluminum alloy.

8. A heat-reflecting pane in accordance with claim 1, wherein the absorption layer consists of a chromium-nickel alloy containing 20 percent of weight of chromium and 80 percent by weight of nickel.

9. A heat-reflecting pane in accordance with claim 1, wherein the anti-reflecting layer comprises zinc sulphide.

10. A heat-reflecting pane in accordance with claim 1, wherein the anti-reflecting layer is covered by a transparent protective layer.

11. A heat-reflecting pane in accordance with claim 1, wherein the anti-reflecting layer is joined by an intermediate layer to a glass cover sheet.

12. A double-glazed window pane, wherein a heat-reflecting pane in accordance with claim 1 forms the outer sheet of the double-glazed pane.

* * * * *